(12) United States Patent
Hicks et al.

(10) Patent No.: US 10,453,047 B2
(45) Date of Patent: *Oct. 22, 2019

(54) MOBILE SCANNER GUN SYSTEM WITH MOBILE TABLET HAVING A MOBILE POS AND ENTERPRISE RESOURCE PLANNING APPLICATION FOR POS CUSTOMER ORDER FULFILLMENT AND IN STORE INVENTORY MANAGEMENT FOR RETAIL ESTABLISHMENT

(71) Applicant: Retail Technologies Corporation, Orlando, FL (US)

(72) Inventors: Bruce J. Hicks, Windermere, FL (US); Brian K. McWhirter, Winter Garden, FL (US); DeVan McArthur, Gulf Breeze, FL (US); Bromley Williams, Orlando, FL (US)

(73) Assignee: RETAIL TECHNOLOGIES CORPORATION, Orlando, FL (US)

( * ) Notice: Subject to any disclaimer, the term of this patent is extended or adjusted under 35 U.S.C. 154(b) by 527 days.

This patent is subject to a terminal disclaimer.

(21) Appl. No.: 13/783,058

(22) Filed: Mar. 1, 2013

(65) Prior Publication Data

US 2014/0249941 A1 Sep. 4, 2014
US 2017/0083888 A9 Mar. 23, 2017

Related U.S. Application Data

(60) Provisional application No. 61/751,904, filed on Jan. 13, 2013.

(51) Int. Cl.
*G06Q 20/20* (2012.01)
*G06Q 20/32* (2012.01)
(Continued)

(52) U.S. Cl.
CPC ......... *G06Q 20/202* (2013.01); *G06K 7/1098* (2013.01); *G06K 7/10821* (2013.01);
(Continued)

(58) Field of Classification Search
CPC .... G06Q 20/202; G06Q 20/32; G06Q 20/322; G06Q 20/203; G06Q 20/327; G06K 7/10821; G06K 7/1098; G07G 1/0081
See application file for complete search history.

(56) References Cited

U.S. PATENT DOCUMENTS 4,387,297 A 6/1983 Swartz et al. ........... 235/472.01
4,496,831 A 1/1985 Swartz et al. ........... 235/472.01
(Continued)

OTHER PUBLICATIONS

Karpischek, Stephan, et al. "Mobile sales assistant—an nfc-based product information system for retailers." 2009 First International Workshop on Near Field Communication. IEEE, 2009.*

*Primary Examiner* — Asfand M Sheikh
(74) *Attorney, Agent, or Firm* — Ernest D. Buff & Associates, LLC; Ernest D. Buff, Esq.; Margaret A. LaCroix, Esq.

(57) ABSTRACT

A mobile scanner gun system is designed for a retail store with integrated mobile tablet device carried by employees. The mobile tablet device is connected to the pistol gun base housing through a base mount universal receiver with rotational coupling, and communicates to a USB barcode scanner/reader and MSR through a specialized universal serial bus wiring harness. The Main PCB has an EEPROM controlling operations of a scanner and an MSR. The mobile tablet device has mobile applications which allow wireless communication in the form of Wi-Fi or wireless cellular with a POS store systems server and corporate ERP system, and also commands the EEPROM. Merchandise to be purchased is scanned and received by the mobile tablet device and then sent wirelessly to the POS store systems server and (Continued)

corporate ERP system to obtain product data concerning description, price, inventory, electronic and physical coupon, promotions, customer loyalty data and rewards.

15 Claims, 5 Drawing Sheets

(51) Int. Cl.
*G07G 1/00* (2006.01)
*G06K 7/10* (2006.01)
*G06K 7/00* (2006.01)

(52) U.S. Cl.
CPC .......... *G06Q 20/203* (2013.01); *G06Q 20/32* (2013.01); *G06Q 20/322* (2013.01); *G06Q 20/327* (2013.01); *G07G 1/0081* (2013.01)

(56) References Cited

U.S. PATENT DOCUMENTS

| | | | |
|---|---|---|---|
| 4,835,374 A | 5/1989 | Swartz et al. ........... 235/472.01 |
| 4,970,379 A | 11/1990 | Danstrom .................... 250/205 |
| 5,070,293 A | 12/1991 | Ishii et al. .................... 320/108 |
| 5,324,922 A | 6/1994 | Roberts ........................ 235/375 |
| 5,349,497 A * | 9/1994 | Hanson .................. B60R 11/02 16/422 |
| 6,109,528 A * | 8/2000 | Kunert ............... G06K 7/10881 235/462.45 |
| 6,726,070 B2 * | 4/2004 | Lautner ............... A44C 5/0007 224/221 |
| 6,853,293 B2 | 2/2005 | Swartz et al. ............... 340/5.92 |
| 7,010,501 B1 | 3/2006 | Roslak et al. ................. 705/23 |
| 7,051,943 B2 * | 5/2006 | Leone .................... G06K 7/10 235/383 |
| 7,913,912 B2 | 3/2011 | Do et al. ................. 235/472.01 |
| 7,971,782 B1 * | 7/2011 | Shams .................. G06Q 20/20 235/379 |
| 8,235,289 B2 | 8/2012 | Hsu et al. ..................... 235/383 |
| 8,235,294 B2 | 8/2012 | Miller et al. ............. 235/472.02 |
| 8,250,187 B2 | 8/2012 | Cacheria, III et al. ....... 709/221 |
| 8,255,499 B2 | 8/2012 | Cacheria, III et al. ....... 709/221 |
| 8,255,500 B2 | 8/2012 | Cacheria, III et al. ....... 709/221 |
| 2002/0123957 A1 * | 9/2002 | Notarius et al. ................ 705/37 |
| 2003/0216969 A1 * | 11/2003 | Bauer et al. .................... 705/22 |
| 2007/0228163 A1 * | 10/2007 | Schon et al. .................. 235/383 |
| 2010/0070376 A1 * | 3/2010 | Proud et al. .................... 705/21 |
| 2011/0231272 A1 * | 9/2011 | Englund et al. ................ 705/21 |
| 2011/0290876 A1 * | 12/2011 | Graves et al. ................ 235/385 |
| 2012/0066079 A1 * | 3/2012 | Falzone ................ G06Q 20/20 705/16 |
| 2012/0072350 A1 | 3/2012 | Goldthwaite et al. .......... 705/44 |
| 2012/0118770 A1 * | 5/2012 | Valls ..................... F16M 11/10 206/320 |
| 2012/0209749 A1 | 8/2012 | Hammad et al. ............. 705/27.1 |
| 2012/0284131 A1 | 11/2012 | Soffer et al. .................... 705/17 |
| 2012/0296741 A1 | 11/2012 | Dykes ........................ 705/14.53 |
| 2012/0298740 A1 | 11/2012 | Hsu et al. ..................... 235/375 |
| 2013/0030933 A1 | 1/2013 | Talach et al. ................... 705/17 |
| 2014/0018128 A1 * | 1/2014 | Martin ................. G06K 7/0004 455/556.1 |
| 2015/0009672 A1 * | 1/2015 | Girault .................. G06F 1/1632 362/253 |
| 2015/0355681 A1 * | 12/2015 | Chen ..................... G06F 1/1654 361/679.56 |
| 2018/0187829 A1 * | 7/2018 | Bacallao .............. F16M 11/041 |

* cited by examiner

MOBILE SCANNER GUN SYSTEM WITH MOBILE TABLET HAVING A MOBILE POS AND ENTERPRISE RESOURCE PLANNING APPLICATION FOR POS CUSTOMER ORDER FULFILLMENT AND IN STORE INVENTORY MANAGEMENT FOR RETAIL ESTABLISHMENT

CROSS-REFERENCE TO RELATED APPLICATIONS

This is Nonprovisional patent application is related to Applicant's U.S. Nonprovisional application entitled "Mobile Barcode Scanner Gun System With Mobile Tablet Device Having A Mobile Pos And Enterprise Resource Planning Application For Customer Checkout/Order Fulfillment And Real Time In Store Inventory Management For Retail Establishment" Ser. No. 13/783,089; U.S. Nonprovisional application entitled "Wearable Mobile Scanner System With Mobile Tablet Having A Mobile Pos And Enterprise Resource Planning Application For Pos Customer Order Fulfillment And Method In Store Inventory Management For Retail Establishment" Ser. No. 13/783,110; U.S. Nonprovisional application entitled "Wearable Mobile Scanner System With Mobile Tablet Having A Mobile Pos And Enterprise Resource Planning Application For Pos Customer Order Fulfillment And In Store Inventory Management For Retail Establishment" Ser. No. 13/783,119; and U.S. application entitled "Store Mobile Cloud Application System For Inventory Management And Customer Order Fulfillment And Method For Retail Establishment" Ser. No. 13/783,127, which Nonprovisional applications are co-pending and filed on the same date herewith, and the disclosures of which co-pending Nonprovisional applications are hereby specifically incorporated herein by reference thereto.

This Nonprovisional patent application claims the benefit of the filing date for U.S. Provisional Application No. 61/751,904, filed Jan. 13, 2013, the disclosure of which is hereby specifically incorporated in its entirety by reference thereto.

1. Field Of The Invention

The system and method of the present invention relates to mobile barcode scanner guns for sales transactions; and, more particularly to software systems implemented by barcode readers, inventory and point of sale devices for use in retail establishments.

2. Description Of The Prior Art

Current retail systems utilize various types of barcode readers, tablets, register stations and Point-of-Sale (POS) devices. For example, one particularly common type of barcode reading device is that used at the checkout register or register station of a store, displaying the price of an item to the checkout clerk, who can then process the sale. Other frequently utilized barcode reading devices can be found at various kiosks in a store wherein a customer can scan an item for a price-check, however these kiosk barcode reading devices do not process the sale, and only provide the ability to view the price of the item scanned. Generally, the checkout counter or register station is in a central location and customers typically must line up at the checkout register bringing with them all the products to be purchased. As the register stations are the only means for the POS transaction, customers are required to wait, often in a line, to checkout via either self-checkout at a register station or at a traditional check-out register operated by an employee of the retail establishment. However, these barcode scanning devices and software implemented therein, fail to provide a combination of mobile technology with POS technology, and further fail to provide the ability to manage inventory throughout the retailer's franchise.

Another type of barcode reading device is a mobile handheld scanner, which is used by store and warehouse associates to manage inventory tasks such as physical inventory, cycle counting, inventory receiving, store to store transfers, return to vendor and product ticketing. However, these devices are only used for inventory management and have no ability to process sales.

Various systems and devices heretofore disclosed and utilized are set forth hereinafter.

U.S. Pat. No. 6,853,293 to Swartz et al. discloses a wearable communication system. A portable data input or computer system includes an input/output device such as a keyboard and a display, as well as another data input device such as an optical barcode scanner, and a data processor module. To scan barcode type indicia, the operator points the scanner at the barcode and triggers the scanner to read the indicia. Each of the system components is distributed on an operator's body and collectively form a personal area system (PAS). Components may include a scanner or imager, a wrist unit, a headpiece including an eyepiece display, speaker and a microphone. Components within a particular PAS communicate with each other over a personal area network (PAN). Individual PASs may be combined into a network of PASs called a PAS cluster. PASs in a particular PAS cluster can communicate with each other over another wireless communication channel. Individual PAS can gain access to a Local Area Network (LAN) and/or a Wide Area Network (WAN) via an access point. Individual PASs can use devices, such as servers and PCs situated either on the LAN or the WAN to retrieve and exchange information. Individual PAS components can provide automatic speech and image recognition. PAS components may also act a telephone, a pager, or any other communication device having access to a LAN or a WAN. Transmission of digitized voice and/or video data can be achieved over an Internet link. The wearable communication system has a CPU and communicates by wireless communication with a trigger worn elsewhere. No tablet is provided, and the system does not communicate barcode information or payment card information wirelessly to a main computer in a retail environment.

U.S. Pat. No. 7,010,501 to Roslak et al. discloses a personal shopping system. The personal shopping system is designed for combined use in both the home of a user and a shopping establishment. The system includes a host computer which is coupled to a host modem and, optionally, to at least one wireless multi-access point. The portable terminal can be used in both the shopping establishment and the home of the user. It is configured to read barcodes associated with items related to shopping, and includes a memory, a barcode reader, a wireless transceiver, and a data interface. The data interface of the terminal communicates with a data interface of the shopping establishment kiosk cradle or directly with the shopping establishment's communications network. This portable terminal communicates with a kiosk and has a very limited range of communication. The portable terminal has a barcode scanner but does not transmit scanned barcode data to an Enterprise Resource Planning (ERP) system in the retail shopping establishment. Moreover, the portable terminal does not have a tablet or an input device, and does not accept swiping of a magnetic payment card.

U.S. Pat. No. 7,913,912 to Do et al. discloses on-demand point-of-sale scanner access. The access system associates or disassociates a mobile point-of-sale scanner device with a particular shopper. Shoppers may be identified, for example, using biometrics or by scanning a loyalty card. As an example of using biometrics, the shopper's fingerprint may be scanned at the same time as a trigger of the scanner is activated to scan an item's barcode. The fingerprint is preferably transmitted, along with the scanned barcode, to a server or other device for comparison to previously-stored information. The scanner is then automatically associated with the shopper to whom the fingerprint corresponds. In another embodiment, scanned loyalty card information is preferably transmitted (optionally, along with a scanned barcode), such that the scanner is then automatically associated with the shopper to whom the loyalty card corresponds. Disassociating the scanner from a shopper is preferably triggered using a sensor (such as a light) that forms part of the scanner device, whereby the sensor is activated when the shopper releases the scanner device. A timer may be used to filter out accidental activation of the sensor. The on-demand point-of-sale scanner access employs a procedure that merely associates the biometric data of the user with a scan gun that is used for scanning an item to be purchased. Since the biometric data of the user is previously stored in the main computer, the purchase of the scanned item is added to the list of purchased items. The scanning operation is not carried out by the employee of a retail establishment, and the details of the product are not presented to the customer. Merely scanning an object adds the scanned object to the purchased list, and the customer has no means to delete the item from the purchased list. The scanner does not have a tablet attached thereto.

U.S. Pat. No. 8,235,294 to Miller et al. discloses an accuracy-enhanced scanner. This accuracy-enhanced scanner provides, in response to a first user input, illumination of potential scan targets and, in response to a second user input, scans a selected scan target. The user employs the illumination to aim the scanner at the selected scan target in between providing the first and the second user inputs. The scanner has switches to communicate the user inputs, to specify an operating mode for the scanner, and/or to communicate information codes to a computing device. The scanner has one or more scan engines (such as a barcode reader or an RFID tag reader), and optionally communicates wirelessly with the computing device. A scanning system including the scanner optionally provides feedback to the user based on feedback from a host processor. The scanner is any of a Multi-Mode Ring Scanner (MMRS), a cordless hand scanner, or a Personal Digital Assistant (PDA) with an add-on scanner Scanners of various types are mounted on a ring powered by a wrist worn device. The device does not have a tablet attached to an input device. Even though the ring is said to have a magnetic card reader, there is no indication where this operation can be carried out.

U.S. Pat. Nos. 8,250,187, 8,255,499 and 8,255,500 to Cacheria III, et al. disclose a distributed transaction system. This system is operative to interface predetermined services to a user at a fixed location, and includes a processing platform running an operating system. Also included are pluralities of physical system resource interfaces for interfacing with available physical system resources. The physical system resources allow a user to gain access to the predetermined desired services. The system further includes a data store for storing configuration information that enables the operating system to interface with the available physical system resources through the physical system resource interface associated therewith. A communication resource for interfacing with the operating system allows communication of the operating system with a central office for downloading configuration information to selectively enable ones of the available physical system resources to interface with the operating system through associated ones of the physical system resource interfaces in accordance with the configuration information and the predetermined service selected by a user. A plurality of configurations is stored in the data store, and each is associated with a predetermined service and one or more of the available physical system resources. Each physical system resource interface is uniquely associated with a defined one of the physical system resources. This method has a number of terminals or service providers interacting with a central processor, which can communicate with banks and other financial institutions authorizing credit purchases. While verification of customer at terminal 110 is indicated, '110' is not an employee present on the retail store environment. Also, the terminals are not associated with a barcode scanner and/or mobile tablet device having barcode scanning and magnetic payment card swiping features. There is no employee in the retail location that has a barcode scanner scanning a particular object of interest to a customer, to provide full details of the product, its price and available promotions.

U.S. Pat. Nos. 4,387,297 and 4,496,831 to Swartz et al. disclose entirely field-portable laser scanning systems for reading barcode symbols including a light-weight and small-sized laser scanning head. The laser source, power supply component, optics, scanning elements, sensor circuit, and signal processing circuitry are specially designed for minimal size and weight and volume such that they can all be mounted in the head. The head can be bracket-mounted or hand-held. The housing for the head can be provided with a handle grip, or can be gun-shaped. A trigger initiates repetitive scanning of each object bearing a symbol, and an indicator indicates when the scanning of that particular object has been terminated. A body harness supports the remaining scanner system circuitry.

U.S. Pat. No. 4,835,374 to Swartz et al. discloses a portable laser diode scanning head, aimable at each symbol to be read. The scanning head emits and receives non-readily-visible laser light, and is equipped with a trigger-actuated aiming light arrangement for visually locating and tracking each symbol. Also disclosed are a compact laser diode optical train and an optical folded path assembly, as well as an interchangeable component design and an integral window construction for the head.

U.S. Pat. No. 5,070,293 to Ishii et al. discloses an electric power transmitting device that transmits electric energy from one coil to another coil through an inductive coupling therebetween. One of the coils has an end bent in the axial direction of the coil. When the other coil is to be inserted into said one coil, it can be inserted in not only the axial direction of said one coil, but also a direction transverse to the axial direction through the bent end of the coil. One of the coils is typically housed in a holder, and the other coil is housed in the grip of a gun-shaped, hand-held bar-code scanner When the grip is inserted into a groove defined in the holder, the coils are magnetically coupled to each other, thus providing an inductive coupling.

U.S. Pat. No. 4,970,379 to Danstrom discloses a wand type barcode scanner. The scanner circuit includes a first control loop for reducing the LED driving current as the D.C. voltage level supplied to the digitizer tends to exceed a selected D.C. reference value. A second control loop becomes active when the LED is shut off by the first control loop, e.g. in the presence of sunlight. The second control loop controls the gain of the scanner amplifier so that the D.C. reference level at the input to the digitizer circuit is maintained as the scanner scans barcodes in the presence of sunlight but with the LED de-energized. No tablet is provided, and the system does not communicate barcode information or credit card information wirelessly to a main computer in a retail environment.

U.S. Pat. No. 8,235,289 and U.S. Patent App Pub. No. 20120298740 to Hsu et al. disclose point of sale terminals generally including a housing including at least first and second housing portions which are arranged for relative axial movement from a closed position to an open position, the first housing portion including at least a communications interface adapted for operative communications engagement with a mobile communicator and a first housing portion socket adapted to partially surround the mobile communicator. The second housing portion includes a second housing portion socket adapted to partially surround the mobile communicator. The first and second housing portions are configured such that when they are arranged in the closed position the first housing portion socket and the second housing portion socket together hug the mobile communicator and prevent unwanted disengagement of the mobile communicator therefrom. The point of sale terminals do not provide inventory management in conjunction with point of sale transaction capability throughout a retailer establishment. Furthermore, the terminals are specifically constructed to receive and house a phone device such as that commonly sold under the trade name iPhone. Consequently, the terminals are limited in structure and function to use with narrowly tailored constructs. Moreover, the terminals provide for a magnetic card swiping device integrated within the terminal body itself, and as a result the phone device must be mounted within the particular terminal to carry out the point of sale transaction.

U.S. Pat. No. 5,324,922 to Roberts discloses an apparatus for managing a transaction using a transaction terminal having a manual code reading device, such as a barcode reader, for reading a data code printed on a visual medium. A transaction program forming part of the system includes at least one page of a visual medium having first and second sets of data codes printed thereon. The first set of data codes is printed in a prearranged sequence and comprises a predetermined sequence of program commands for carrying out all of the steps of a prearranged transaction, including a subset of program commands associated with a corresponding subset of data entry steps. The second set of data codes is printed on the same or another page of said visual medium. Each of the data codes in the second set comprises a prearranged item of transaction data for use in said data entry steps. The transaction terminal includes a computer means interfaced to the manual code reading means. This computer means includes a program storage device and a data storage device. The apparatus relates to managing transactions of the type involving home shopping, bill paying and the like, and does not relate in structure or function to mobile point of sale systems for use in retail establishments. As such, the point of sale terminal does not provide a mobile tablet device capable of being mounted on a scanner device for integration and communication for sales transactions and inventory management.

U.S. Patent Application Publication No. 20120209749 to Hammad et al. discloses a snap mobile payment apparatus, methods and systems. This snap mobile payment (SNAP) system transforms real-time-generated merchant-product Quick Response (QR) codes via SNAP components into virtual wallet card-based transaction purchase notifications. In one embodiment, the SNAP obtains a snapshot of a QR code presented on a display screen of a point-of-sale device from a mobile device. The SNAP decodes the QR code to obtain product information included in a checkout request of the user, and merchant information for processing a user purchase transaction with a merchant providing the QR code. The SNAP accesses a user virtual wallet to obtain user account information to process the user purchase transaction with the merchant. Using the product information, merchant information and user account information, the SNAP generates a card authorization request, and which the SNAP provides to a payment network for transaction processing. Also, the SNAP obtains a purchase receipt confirming processing of the user purchase transaction. The snap mobile payment apparatus, methods and systems require the user to present the QR code and the virtual wallet to make a purchase. This requires the customer to take a picture of the QR code and show it at the sales kiosk register or bring the product to the sales kiosk, a cumbersome operation. There is no employee in the retail location that has a barcode scanner with a tablet adapted for scanning a particular object of interest to a customer, to provide full details of the product, its price and available promotions.

U.S. Patent Application Publication No. 20130030933 to Talach et al. discloses a payment facilitating system for use with a mobile communicator and a point of sale (POS) terminal. The system includes a Near Field Communication (NFC) financial transaction communication link between the mobile communicator and the POS terminal. The NFC financial transaction communication link is operative to communicate NFC data for use in a financial transaction. A non-NFC financial transaction communication link is extant between the mobile communicator and the POS terminal. The non-NFC financial transaction communication link is operative to communicate non-NFC data for use in the financial transaction. A transaction effector is operative to complete the financial transaction using both the NFC data communicated directly between the mobile communicator and the POS terminal over the NFC financial transaction communication link and the non-NFC data communicated directly between the mobile communicator and the POS terminal over the non-NFC financial transaction communication link. The payment facilitating system relates to NCF data transmission for payment at a POS terminal via NCF data programmed with a user's cell phone or smart phone device to provide payment at the checkout via the cell phone. The system does not relate in structure or function to mobile point of sale systems for use in retail establishments.

U.S. Patent Application Publication No. 20120296741 to Dykes discloses a payment system including a transaction server, and a virtual wallet server (VWS). At least one point of sale device including a secure element is operative to provide secure data communication of a purchaser wallet personal identification number (WPIN), but not purchaser payment particulars, to at least the VWS and at least one mobile communicator communicating a mobile communicator presence indicator (MCPI) but neither the purchaser WPIN nor the purchaser payment particulars to the at least one point of sale device. The payment system discloses use of a mobile device at the register counter of a retail establishment for data transmission of payment with the mobile device. The system does not disclose the structure or function of mobile point of sale systems for use in retail establishments.

U.S. Patent Application Publication No. 20120284131 to Soffer et al. discloses a mobile commerce system including a multiplicity of Mobile Device—Point of Sale Communication (MPC)-equipped mobile devices, a plurality of MPC-enabled Point-of-Sale (POS) devices, at least one POS configuration server for configuring the plurality of MPC-enabled POS devices, at least one MPC-equipped mobile device configuration server for configuring the plurality of MPC-equipped mobile devices and at least one mobile marketing platform server operative to introduce Transaction Value Certificate (TVC)-related functions and to communicate both with the at least one POS configuration server and the at least one MPC-equipped mobile device configuration server to coordinate operation thereof so that the MPC-enabled POS devices will be "tap-ready" for carrying out the TVC-related functions. The mobile commerce system has a multiplicity of Mobile Device—Point of Sale Communication (MPC) wallet-equipped mobile devices, typically smart phones such as mobile communicators operating on an ANDROID® (Google), iOS® (Apple), BLACKBERRY® or WINDOWS MOBILE® (Microsoft) operating system, and a plurality of MPC-enabled point of sale (POS) devices, for example, an electronic cash register (ECR), connected to a Near Field Communication (NFC)-enabled payment terminal. The mobile commerce system does not provide a system having a barscanner device integrated and in communication with a mobile tablet with payment card receiving capability. The system does not disclose the structure or function of mobile point of sale systems for use in retail establishments.

U.S. Patent Application Publication No. 20120072350 to Goldthwaite et al. discloses a system for processing a request by a customer to pay a transaction amount, using the customer's account, for a transaction between the customer and a merchant, to provide a payment to an account of the merchant. The transaction incorporates use of a mobile wireless device operated by the customer to provide identification information of the customer's account to an authentication server. A payment server coupled to the authentication server and the merchant passes merchant communications to the authentication server. The authentication server receives the transaction amount from the merchant and receives customer account information from the customer's wireless mobile device, and processes the transaction and account information and, if authenticated, routes the payment transaction to the payment server for payment to the merchant's account. The system discloses use of a mobile device at the register counter of a retail establishment for data transmission of payment with the mobile device. The system does not disclose the structure or function of mobile point of sale systems for use in retail establishments.

Foreign Patent Publication JP09081662 to Kumagai et al. discloses a scanner gun that reads the information of a barcode BC by irradiating the barcode BC which is a read object with a laser beam LB made to exit from a window 4 and making the reflected light incident from the window. Along the exit direction of the laser beam LB, the bar-shaped member of a sighting stick, positioned at the upper part of the window, is mounted to the scanner gun. An operator aligns a sight aided by the bar-shaped member. The scanner gun does not provide a system having a barscanner device integrated and in communication with a mobile tablet with payment card receiving capability. Further, the device does not disclose the structure or function of mobile point of sale system.

Non-Patent Literature "Infinite Peripherals IPC_Infinea_Tab_Spec.pdf" at http://ipclineapro.com/infinea-tab-ipad/ discloses a tablet that is attached to a swivel head and has an application for barcode scanning, magnetic card reading. The IPC Infinea Tab is clearly a stand for attaching a tablet. The Infinea tab has active scanning, active barcode reader, and active search magnetic card reader. It has two buttons for starting the scan operation. It is not indicated to receive a command from a barcode scanner to scan a barcode or read a magnetic card. Further, the Application in the tablet does not communicate with a central corporate ERP system within the retail location to determine detailed description of a scanned product; determine its inventory, price and promotions. Furthermore, it does not also allow the POS store systems server to process a payment card transaction for the purchase of a product.

Non-patent literature entitled "PAYware Mobile Enterprise" found at http://www.verifone.com/products/hardware/mobile/payware-mobile-enterprise discloses a mobile payment solution that transforms smartphones and tablets into secure transaction portals. The literature teaches swiping, inserting or tapping a card, to execute payments. In addition, advanced features such as a 2D barcode imager, integrated PIN pad and customizable app integration are provided for merchants who want their store associates to get up from behind the cash register and interact with consumers anywhere in the store. The mobile payment solution does not provide use outside of the store; the devices disclosed fail to provide the ability for use throughout a retailer's establishment, including other locations and warehouses of the retailer.

Despite heretofore disclosed and utilized systems and methods, managing inventory throughout retailer establishments, nationally and internationally, has proven unreliable and difficult. POS capabilities remain separate from inventory management throughout retailer establishments and as a result both retailers and customers are tied to the physical location of the checkout work station, resulting in frustration and loss of sales.

Based on the foregoing, there exists a need for a Wi-Fi/wireless cellular "mobile scanner gun system" with a "mobile tablet device" utilizing a system and method that communicates daily inventory management such as physical inventory, cycle counting, inventory receiving, store to store transfers, return to vendor, and product re-ticketing, while at the same time providing the ability to process customer sales transactions through a mobile POS application. Further, there is a need in the art for a system and method that is appointed to be utilized with several USB devices such as a mobile portable barcode scanner/2D barcode reader (scanner) and magnetic stripe reader (MSR) devices that can be carried by retail employees in a retail location to provide real-time daily store level inventory management applications for a full combination of tasks, including physical inventory, cycle counting, inventory receiving, store to store transfers, return to vendor, product re-ticketing, as well as mobile POS applications. Additionally, there is a need in the art for a system and method that can scan the merchandise barcode of customer interest, provide complete details of the product along with its selling price and taxes, as well as any physical and electronic coupons, promotions, and customer loyalty data and rewards available. Through use of such a novel system, a customer may decide to purchase the merchandise just scanned or look at additional items, and when a purchase decision is made by the customer, an employee can readily process the purchase, providing a courteous friendly sales environment wherein every employee has complete access to all the relevant information on any product of interest and their customer's loyalty data and rewards available.

SUMMARY OF THE INVENTION

The system and method, and devices utilizing same, of the present invention provides a Wi-Fi and wireless cellular mobile scanner gun system, with an imbedded mobile tablet device, running a real-time store level inventory management suite of applications, StoreMobileRF™, a trademark of Retail Technologies Corporation, connected directly to the corporate Enterprise Resource Planning (ERP) system and running a mobile POS application, StoreMS Mobile™, a trademark of Retail Technologies Corporation, connected directly to the POS store systems server, for customer purchases throughout the retail store and well beyond its walls. Uniquely, the method and systems of the mobile scanner gun system provides the ability to carry out real-time daily store level inventory management functions for such tasks as physical inventory, cycle counting, inventory receiving, store to store transfers, return to vendor, product re-ticketing, and to operatively identify a product by its barcode, establish price, taxes, promotions, physical and electronic coupons and customer loyalty data and rewards available and process sale of merchandise to a customer, regardless of the location of the inventory. From within the POS sales transaction, if the inventory is unavailable in the store, the sold inventory can be transferred from the warehouse, another store or special ordered and made available at any store for customer pickup or shipped to a customer location. In the case the inventory is unavailable, once the transaction is completed on the mobile tablet device, the item and quantity of the selected fulfillment location is allocated within the central corporate ERP system.

One such device adapted for use with the subject system and method is a mobile Wi-Fi/wireless cellular mobile scanner gun system adapted to receive the mobile tablet device. The mobile scanner gun system has a mobile tablet device which can be attached to a variety of base housing devices, through a base mount universal receiver with rotational coupling. The mobile tablet device (upper receiver) has a USB magnetic stripe reader (MSR) input device mounted on one edge of the mobile tablet device and a USB barcode scanner input device incorporated within the "pistol grip" base, the USB scanner input device being operable by pressing a trigger provided in the mobile scanner gun system.

The mobile Wi-Fi/wireless cellular mobile scanner gun system for processing a retail store purchase further preferably comprises a previously programmed electrically erasable programmable read only memory (EEPROM) controlling all actions of the USB scanner input device and the scanner trigger for activating a scan operation of an item of interest to a customer by an employee of a retail establishment. The scan operation is adapted to cause the EEPROM of the Main PCB to communicate with the mobile tablet device, which triggers the application software running on the mobile tablet device to receive a scanned barcode. In operation and function, the customer purchases merchandise from any retail store employee having the mobile scanner gun system receiving full product details, price, electronic and physical coupons, promotions and customer loyalty data and rewards directly from the POS store systems server and corporate ERP system, charges the purchase in a friendly, efficient, informative atmosphere without having the need to bring the merchandise to a central checkout station and waiting in queue to check out.

The mobile tablet device is encased in a hardened case/shell designed to protect the device against drops and damage. The mobile tablet device includes software readable from the subject system and method and is constructed having retail mobile applications associated with software that includes the subject ERP system and POS store systems server associated with a user of the mobile scanner gun system and retailer's data. The system applications are connected and operated through encrypted Wi-Fi or wireless cellular connectivity back to the POS store systems server and the central corporate ERP system relating to the retailer's store level inventory management and mobile POS application throughout the store and beyond its walls. The mobile applications are operative to establish a Wi-Fi or wireless cellular connection between the mobile scanner gun system and the corporate ERP system and POS store systems server (primary and backup) software. This communication is secured using standard Wi-Fi Protected Access (WPA) and Wi-Fi Protected Access II (WPA2) wireless encryption methods. The application has functionality to order an electrically erasable programmable read only memory (EEPROM) present within the Main PCB to conduct various functions, and this directive is sent through the specialized universal serial bus wiring harness. The communication between the USB input devices and the mobile tablet device occurs back and forth depending on a specific application operation.

The EEPROM of the Main PCB carries a programmed instruction set and works in conjunction with the mobile applications residing on the mobile tablet device. For example if a barcode scanner gun trigger of the mobile scanner gun system is pressed by the retail store employee according to the interest of a customer, this event is detected by the EEPROM of the Main PCB and is communicated to the mobile application within the mobile tablet device. The EEPROM interprets and parses the barcode read and formats it in a manner that is readily recognized by the mobile application. The mobile application communicates with the POS store systems server and the corporate ERP system to obtain the details of the merchandise scanned, its selling price, any physical and electronic coupons, promotions, and customer loyalty rewards data available and the available inventory of the merchandise chain-wide, including the warehouse. The mobile tablet device displays the entire data on the screen and the retail store employee may discuss these details to the customer allowing the customer to make a purchase decision. Optionally, the application may suggest other similar products with enhanced functionality, reduced selling price and the like. Accordingly, the customer may view similar merchandise and review merchandise details to come to a purchase decision. Optionally, if the merchandise is not available in the current store's inventory, the employee may suggest the merchandise be shipped from the warehouse or another store within the chain.

When the customer reaches a purchase decision of merchandise displayed on the mobile tablet device screen, the employee of the store touches an application icon to add the merchandise to the POS transaction. If shipping is required, the customer provides the customer name, address, contact telephone number, and email address if they are not already in the customer loyalty database. The customer provides a payment card to the retail store employee which is swiped in the MSR slot of the mobile tablet device (upper receiver). The MSR track data is encrypted using industry standard Triple DES with DUKPT by the MSR reader, then sent to the EEPROM to be interpreted and parsed before the data is transferred to the mobile POS application. The employee allows the customer to sign their name on the device using a customer signature capture feature of the mobile POS application to validate the sale and then the information received from the customer is securely transferred by wireless communication to the POS store systems server, which processes the customer's payment card purchase by contacting a certified bank card processor via a PCI compliant network connection. Upon receiving credit authorization of the purchase, the mobile tablet device of the mobile scanner gun system displays information that the purchase is complete and the employee bags and delivers the merchandise sold to the customer. The POS store systems server updates the corporate ERP system, adjusting the inventory on-hand of the merchandise, regardless of the fulfillment location of the sold merchandise, thus becoming visible across the retail chain upon completion of the transaction. The POS store systems server sends an email of the receipt to the customer's email address, which may be readily viewed on a smart phone carried by the customer. If desired, a hard copy of the receipt for the purchase is printed on a local printer within the retail establishment via the store's local network.

With this system, the customer does not have to bring the merchandise to a central check out location. The POS sales transaction can be conducted anywhere in the retail establishment and beyond its walls, by a retail store employee carrying a mobile scanner gun system, and has up to date information concerning product inventory of any item in their retail location or chain-wide, along with current product details, electronic and physical coupons, promotions and customer loyalty rewards data available to the customer.

The following paragraph details the elements, which collectively enable operation of the system as detailed hereinabove. The mobile tablet device of the mobile scanner gun system preferably comprises a custom-developed, industry-hardened device utilizing a specialized universal serial bus wiring harness to communicate with USB devices such as MSRs and barcode scanners/readers. Various operating systems, such as those associated with the trade name Android (Google), iOS (Apple), and Windows (Microsoft) are contemplated. The mobile tablet device has custom programmed mobile applications on the Android platform. The mobile tablet device (upper receiver) is connected to each base housing concept through a base mount universal receiver with rotatable coupling, integrated into each of the four base housing concepts, including a mobile scanner gun system, a wearable mobile scanner system, a handheld device, and a fixed docked POS workstation, each with a USB scanner input device integrated into the base, except for the handheld housing, which has the USB scanner input device integrated into the mobile tablet device (upper receiver) directly below the MSR. The rotational coupling permits changing the orientation of the mobile tablet device in the portrait mode or in the landscape mode of the mobile tablet device display screen. The upper receiver has an industry standard MSR input device integrated along the short edge of the mobile tablet device for easy access by the user regardless of which base housing is selected for use.

A key feature of the invention is an electrically erasable programmable read only memory (EEPROM) that has a previously programmed instruction set present within the Main PCB. The EEPROM is built into the main PCB and is integrated into the design of the upper receiver and is connected to the mobile tablet device to process the commands issued by the mobile application to command USB devices such as the barcode scanner/reader or the MSR to acquire required data. The EEPROM of the Main PCB organizes the data in proper format and delivers it to the mobile tablet device through the specialized universal serial bus wiring harness. Due to the use of the EEPROM, which can process barcode and payment card data, the attached mobile tablet device can perform secure distributed sales within a retail establishment. Each of the employees of the retail establishment knows instantaneously the inventory of any particular item chain-wide, the barcode of an item that is scanned along with its price as well as discounts, electronic and physical coupons, promotions, and customer loyalty data available to the customer at the time. Thus a customer may look at several items and ask the employee of the retail organization to know its price, details concerning the item, and any promotion, electronic or physical coupons, that are available, including customer loyalty rewards. This provides a pleasant, informative interaction between the customer and the employee of the retail organization, establishing one-on-one, face-to-face relationship, which is appreciated by the customer and results in an improved sales environment.

In its preferred embodiment, the mobile scanner gun system of the present invention comprises:

i) a mobile tablet device having Wi-Fi communicative capability to the POS store systems server and the corporate ERP system in a retail store attached to a pistol grip base housing through a base mount universal receiver with rotational coupling, forming a mobile scanner gun system carried by an employee in a retail store;

ii) a mobile tablet device having wireless cellular communicative capability to the POS store systems server, centrally located backup POS store systems server and the corporate ERP system. The mobile tablet device is attached to a pistol grip base through a base mount universal receiver with rotational coupling, forming a mobile scanner gun system carried by an employee in a retail store;

iii) said mobile tablet device having application software capable of commanding an electrically erasable programmable read only memory (EEPROM) present on the Main PCB to acquire barcode scan or obtain payment card information from a swiped payment card;

iv) said scanner input device having a scanner trigger for activating a scan operation by an employee of a retail establishment, at which point the EEPROM of the Main PCB communicates with said mobile tablet device, launching said application software to get the mobile tablet device ready for received barcode;

v) said mobile tablet device having an MSR for processing customer payment card data by an employee of a retail establishment, at which point the EEPROM of the mobile tablet device communicates with the store systems server to process customer payment card data through the proper secured bank card processor via a PCI certified network through the POS store systems server;

vi) said application software communicating with said POS store systems (primary or backup) server and corporate ERP system to obtain detailed information of the merchandise scanned, its inventory, selling price electronic and physical coupons, promotions, and customer loyalty data available;

vii) said employee of the retail establishment communicating to a customer, the description, price, electronic and physical coupons, promotion data, and customer loyalty rewards data available to the customer;

viii) said customer deciding to purchase the merchandise and the employee accessing a purchase routine of said mobile POS application software, entering customer name, address and e-mail address if needed, and swiping customer data, and said input device communicating formatted customer payment card data securely to said POS store systems server;

ix) said POS store systems server contacting a PCI certified bank card processor authorizing said purchase and communicating to the mobile tablet device that the customer has purchased the scanned merchandise;

x) said POS store systems server communicates with the corporate ERP system to adjust said product inventory, send a receipt for to the e-mail address of the customer, and print a hard copy of the transaction on a store network printer;

xi) said mobile tablet device being operative, in the event that said authorization is denied, to inform the employee of this credit denial, so that said customer is informed and can provide alternative payment;

whereby the store employee has the ability to carry out daily store level inventory management functions for such tasks as physical inventory, cycle counting, inventory receiving, store to store transfers, return to vendor, product re-ticketing, whereby the customer purchases merchandise from any retail store employee having a mobile scanner gun system receiving full product details, price, electronic and physical coupons, promotions and customer loyalty data available and transacts the customer purchase in a friendly atmosphere without having any need to bring the merchandise to a central checkout station and waiting in queue to check out.

BRIEF DESCRIPTION OF THE DRAWING

The invention will be more fully understood and further advantages will become apparent when reference is had to the following detailed description of the preferred embodiments of the invention and the accompanying drawing, in which:

FIG. 1b is a top-side of the embodiment of FIG. 1a;

DETAILED DESCRIPTION OF THE INVENTION

Figure 1A:
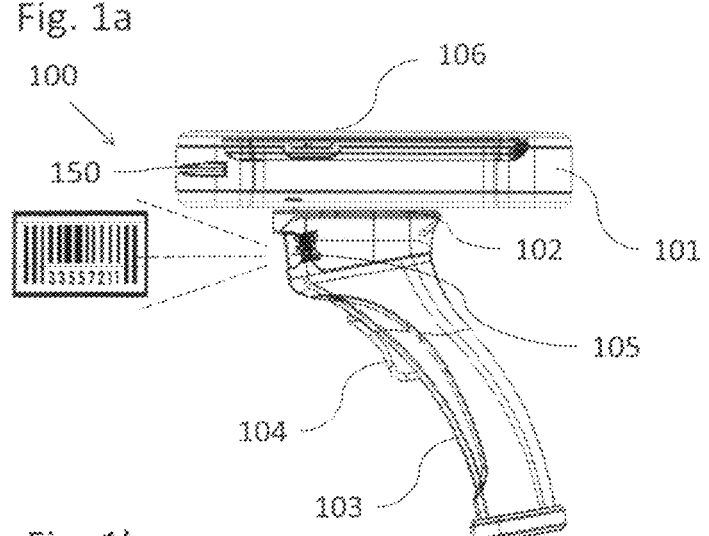
FIG. 1a is a side-view drawing of an embodiment of the mobile scanner gun system docked through a base mount universal receiver with rotational coupling to a mobile tablet device operating in concert under the enterprise resource planning mobile application's environment.

This invention relates to real-time store level inventory management and a fully functioning POS system for customer check-out of merchandise in a retail sales environment. The system comprises a mobile tablet device (upper receiver) having a display and an industry standard USB MSR input device integrated along the short edge of the mobile tablet device for easy access by the user and attached rotatably to a pistol grip base housing through the base mount universal receiver with rotational coupling and in communication with a USB scanner input device integrated into the base housing through the specialized universal serial bus wiring harness. The mobile scanner gun system is adapted to interchangeably receive and communicate with a mobile device, particularly a mobile tablet device, having a system integrated therein that enables store level real-time inventory management and a fully functional POS system capable of selling merchandise in a retail sales environment at any of a retailer's global locations.

The system and method of the present invention provides technology that empowers sales associates to service their customers without consideration to the physical location of the merchandise. Through use of the subject system and methods, goods can be purchased anywhere, anytime and delivered wherever and whenever the consumer wants it. Under current systems and methods, the consumer must travel to the location of the good (or order the good on-line through their personal device and wait for delivery or in store pick-up). This adds an inconvenient step—that is rather than allowing the sales associate to simply handle the purchase via a mobile POS device and have the item delivered where the customer wants, the customer must drive to the other location or place his/her own order through his/her own means. Not only is this inconvenient, but such inconvenience often results in the loss of the sale altogether, as the customer may decide to forego the purchase, or simply move on to the competitor's store if it is nearby and convenient to do so.

None of the heretofore systems and methods provide the ability for a retailer to utilize software and hardware that runs the entire store, ranging from real-time inventory management, to POS sales transactions. The system, method and devices herein provide this unique advantageous feature. The subject system and method, and devices implementing same, provide the following advantages: 1) increased store productivity, 2) reduced technology cost and footprint, and 3) improved customer satisfaction, all of which in turn lead to ensure return on investment (ROI).

ERP systems integrate internal and external management information throughout an organization, embracing finance/accounting, manufacturing, sales and service, customer relationship management, etc. ERP systems automate this activity with an integrated software application. The purpose of ERP is to facilitate the flow of information between all business functions inside the boundaries of the organization and manage the connections to outside stakeholders. ERP systems can run on a variety of computer hardware and network configurations, typically employing a database as a repository for information. Examples of vendors who build industry leading ERP systems include: JDA Software Group, Oracle, SAP, Epicor, etc. However, present systems do not provide the ability for a store employee at a physical store location to have direct mobile access to real-time inventory management and POS capability.

The subject system and methods provides real-time inventory management and POS to retail establishments that complement current merchandising systems generally utilized by businesses. Real-time mobile functionality is provided by the subject system and methods, preferably built around the JDA ERP system (MMS) environment, leveraging current legacy store systems and accessing the current MMS iSeries environment. Through use of the subject system MMS iSeries environment, businesses can build their own cloud to provide mobile customer check-out/order fulfillment and real-time inventory management in the store through the mobile scanner gun system.

Uniquely, the subject system and method provides the ability to use a mobile tablet device in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction. Implementation of the subject system and methods, and devices thereon provides strong inventory management, and leveraging current technology infrastructure ensures ROI.

Advantageously, the subject system, method and devices of the present invention allow a sales associate using a mobile scanner gun system anywhere in the store and physically beyond the store, to carry out inventory management tasks such as: a) Daily Cycle Counting & Physical Inventory, b) Receiving & Returns, c) Store Transfers, d) Item Checking, e) Re-Ticketing, etc. Such tasks are performed real time within the ERP system and are all visible chain-wide. Further, the sales associate can run POS transactions on the sales floor, with all the capability previously contained at the POS cash wrap. Through use of the subject system and method, a sales associate can perform the following from a mobile scanner gun system: i) sell "out of stock" merchandise available in the warehouse, another store or from a vendor; ii) create a purchase order (PO) or transfer within MMS and track that item transfer on the web; iii) sell merchandise from their e-commerce site; iv) combat "Showrooming" by providing customers real-time competitive merchandise and pricing information, allowing staff to match prices and satisfy their customer's demands by exceeding expectations at the point of purchase.

Mobile POS represents the forefront of retail stores. For decades retail stores have been designed around cash-wrap POS stations/register stations. New studies indicate that cash-wrap POS stations/register stations are becoming less relevant in future retail markets. Approximately one fifth (21.4%) of retailers are planning on removing or decreasing use of traditional fixed-station POS/register stations per store. In many retail verticals, mobile POS will eventually replace these systems. As mobile devices mature and harden the need for POS register stations, terminals and smart RF scan guns with cryptic processes will continue to dwindle.

However, today's enterprise RF data terminals fall short; although many are durable and retail hardened, and work well for inventory, they are ineffective on sales floor for POS customer check-out due to lack of functionality and usability. Moreover, conventional enterprise RF data terminals are very expensive and locked into outdated technology. Although consumer devices appear to have some potential to fill this gap, these devices lack durability, hardware integration, and retail specific software and functionality.

The system and method of the present invention provides implementation within a mobile scanner gun system that performs all the necessary real-time store level inventory management functions and utilize the Internet to provide competitive analysis, thus determining product pricing for the customer and transacting the sale accordingly. The mobile scanner gun system is totally mobile throughout the store and beyond its walls and does not compromise workflow or require extensive training to use. The system, method, and devices of the present invention 1) match the exceptional "work flow" performance of legacy radio frequency (RF) data terminal for inventory management, 2) match the transaction speed of the POS terminal found in a high volume retail store, 3) are Payment Card Industry (PCI) compliant, since security is a necessary prerequisite in today's retail environment, and 4) are durable, since the store environment will challenge practically any piece of hardware.

An advantageous feature of the mobile scanner gun system and integrated mobile tablet device of the invention is the simplicity of their design, which ensures that the final product is both richly functional and cost effective. The mobile tablet device (upper receiver) is removable from the mobile scanner gun system, is readily docked in other types of base housing platforms, and is additionally capable of being docked in a fixed POS workstation. By using standard industry components such as USB industry standard MSR heads and barcode scanner components in conjunction with a preferably customized mobile tablet device, the mobile scanner gun system with mobile tablet device integration capability therein will provide all the standard features of a typical consumer grade mobile tablet device, coupled with retail industry hardened components integrated into an industry hardened frame—built for industrial use—with an "easy to use" scan gun model, wearable model, hand held model and fixed POS station model and with the subject system and method readable therein. The functional specification of the mobile tablet device is a mini mobile tablet device that preferably measures about 2 inches to 10.5 inches diagonally, preferably 4 inches to 7 inches, and most preferably 5 inches to about 5.5 inches diagonally. The handle of the mobile scanner gun system is preferably coated with rubber for comfort and/or is received within a comfort grip rubber covering, and trigger is ergonomically designed to be more like a pistol. Rotation from landscape mode to portrait mode of the mobile tablet device is achieved with compression tubes, as compression springs roll in and out via a dial and rotates smoothly but stays in place when it gets there. The mobile tablet device slides on and off from the mobile scanner gun system device through communication of a button on one side of the mobile tablet device, sliding on and off via a groove slide. The USB input devices of the mobile scanner gun system is powered by a rechargeable lithium ion battery, as well as a battery backup that extends battery life for a period of time that is necessary to assure uninterrupted operation on the sales floor.

A specialized universal serial bus wiring harness is used for charging the lithium ion battery system. Portability of the mobile scanner gun system's upper receiver for the system and method mobile tablet device implementation provides four base housing concepts. The mobile scanner gun system's upper receiver with integrated mobile tablet device and MSR is consistent for three of the four base housing concepts: 1) The mobile scanner gun system 2) The wearable mobile scanner system 3) The fixed docked workstation. The fourth base housing concept is the handheld housing and requires the scanner device to be mounted integrally into the upper receiver along with the mobile tablet device and the MSR. Portability makes the system's mobile tablet device upper receiver even more valuable.

Generally stated, the present invention comprises a system and method for use with a mobile scanner gun system associated with an integration capable mobile tablet device. This system, method, mobile scanner gun system and integration capable mobile tablet device is used by an employee on a sales floor of a retail establishment for both daily inventory management purposes for such tasks as physical inventory, cycle counting, inventory receiving, store to store transfers, return to vendor, product re-ticketing and to operatively identify a product by its barcode, establish price, promotions, electronic and physical coupons and customer loyalty data and rewards available to the customer and process sale of merchandise to a customer regardless of the location of the inventory. The sold inventory can be transferred to any store for customer pickup or shipped to a customer location from the mobile scanner gun system. Once the transaction is completed on the mobile scanner gun system, the sold item is allocated and systemically visible within the ERP system chain-wide. With this system, the customer does not have to bring the merchandise to a central check out location. In conventional systems, the checkout procedure is typically carried out without the customer having adequate knowledge of the product, or comparing its features, price or the like with other competing products. Through use of the system and method implemented for use with a mobile scanner gun system and integration capable mobile tablet device, an employee of a retailer can sell merchandise, not only from within their particular store's inventory, but within any store or any warehouse chain wide. The mobile scanner gun system reads the barcode of a particular item that is available for purchase, and retrieves from the POS store systems server, using Wi-Fi or wireless cellular communication, details concerning the product. Such details may include current pricing, together with discounts available, so that the retail sales employee on the floor can communicate the pricing structure to a potential customer at the point-of-sale. If the customer decides to purchase the merchandise, the name of the customer as well as the customer's e-mail address is recorded if they are not already in the customer loyalty database, and the payment card of the customer is swiped on the mobile scanner gun system. The appropriate encrypted payment card information is wirelessly transmitted via an encrypted communication to the POS store systems server within the store and onto a certified bank card authorization processor through a PCI certified network connection, whereby the encrypted authorization is returned to POS store systems server. Unless credit is denied, the purchase is authorized and the customer is given the purchased merchandise. The receipt for this purchase can be printed on the store network or sent by e-mail to the customer. The POS store systems server updates its local inventory database and transmits that adjustment to the corporate ERP system of the merchandise that has been sold, and the inventory for each of the items sold are updated to show the current inventory positions of any particular item visible chain-wide.

The mobile tablet device of the mobile scanner gun system preferably comprises a custom-developed, industry hardened device utilizing specialized universal serial bus wiring harness. Various operating systems, such as those associated with the trade name Android, iOS, and Windows are contemplated.

The mobile tablet device is connected through a base mount universal receiver with rotational coupling to a pistol gun base housing, which is placed directly below the mobile tablet device in the mobile scan gun system. The rotational coupling permits changing the orientation of the mobile tablet device in the portrait mode or in the landscape mode of the mobile tablet device display screen. There are a minimum of two standard USB input devices with others contemplated: A barcode scanner and an MSR. The UBM MSR input device is positioned on the short edge of the mobile tablet device directly above the scanner in the mobile scanner gun system, which is forward facing on the base of the gun in front of the trigger. Both USB input devices are connected to the mobile tablet device using a specialized universal serial bus wiring harness through the mobile tablet device USB port. The mobile tablet device has custom programmed applications in the Android, IOS and Windows platforms. Other USB input devices contemplated are a variety of mobile chip and pin payment card readers that would replace the MSR on the mobile scanner gun system upper receiver or connected remotely using Blue Tooth technology for communication between the mobile tablet device and the mobile chip and pin payment card reader.

Figure 1B:
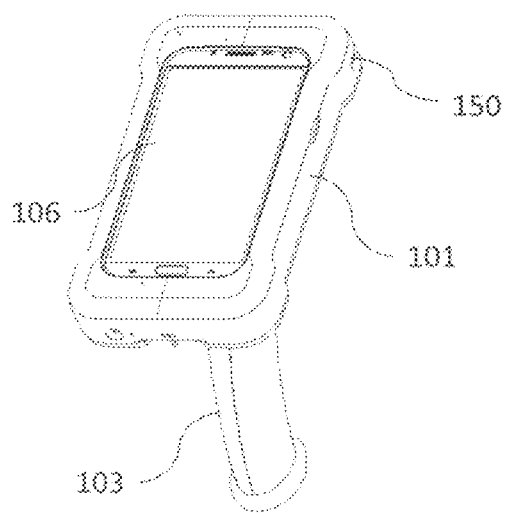

FIGS. 1a and 1b illustrate a first embodiment of the subject mobile scanner gun system with integration of a mobile tablet device operational with the system and method, shown generally at 100. FIGS. 1a shows a side-view while FIG. 1b shows a top-side view of the device. The mobile scanner gun system is shown generally at 100 in FIGS. 1a and 1b. Referring to FIGS. 1a and 1b, the mobile scanner gun system 100 has a mobile tablet device 101 attached to a base mount universal receiver with rotatable coupler 102, which permits the alignment of the mobile tablet device in the portrait or landscape mode. The figure shows the mobile tablet device in the portrait mode. A plurality of applications is present in the mobile tablet device display screen 106. The mobile scanner gun system has a gun handle 103 with a trigger 104, which activates the barcode scanner 105. Illumination from the barcode scanner is shown in FIG. 1. Preferably, an MSR slot 150 for carrying-out payment card transactions is present on the short edge of the mobile tablet device 101. In landscape mode, the MSR 150 is perpendicular to the scanner; in portrait mode, the MSR 150 is parallel to the scanner as shown in FIG. 1a. The base mount universal receiver with rotational coupler 102 is connected by a groove slide mechanism on the back side of the mobile tablet device 101 and is also not visible in this figure since it is incorporated within the rotatable connection between the mobile tablet device and the pistol gun base housing (see Figures hereinafter).

There are a number of specifically designed programmed applications that allow the mobile tablet device to command the USB input devices through the specialized universal serial bus wiring harness to perform various functions typical to scanner operations and MSR operations. Running of the specially programmed mobile POS application, StoreMS Mobile™ is initiated and a command is sent to the EEPROM to acquire a barcode scan. The mobile tablet device in this mode is ready to receive the barcode data from the USB scanner input device and communicates with the POS store systems server at the retail facility and the corporate ERP system to obtain specific product information such as, product availability within the store and chain, price and any promotions available, available physical and electronic coupons and customer loyalty information. The employee of the retail organization presents the data that is related to the particular item of interest to the customer. When the customer decides to purchase the particular item scanned, the employee of the retail organization uses the mobile POS application to process the sales transaction, if needed for shipping, pertinent customer information is taken or their records are updated if they are already a loyalty rewards customer. At tender, this POS transaction can open the cash drawer wirelessly for cash transactions and can also launch a request for processing the sale using a customer payment card. The customer's payment card is swiped via the USB MSR input device, which is located on the short edge of the mobile tablet device. All pertinent customer payment card data is encrypted by the MSR and the EEPROM communicates the encrypted data through the specialized universal serial bus wiring harness to the mobile tablet device.

The mobile POS application, StoreMS Mobile™, present in the mobile tablet device communicates all pertinent customer payment card data, using a PCI compliant encrypted Wi-Fi connection or wireless cellular connection, to the POS store systems server. The POS store systems server contacts the bank card processor through a PCI certified network connection for payment card authorization for the purchase. If the purchase is authorized, this information is sent to the mobile tablet device display screen for customer signature using an integrated signature capture application built within the mobile POS application on the mobile tablet device and the customer is allowed to take possession of the merchandise purchased. The POS store systems server can send a receipt for the purchase to the e-mail address of the customer if desired. The POS store systems server records this purchase and instructs the corporate ERP system to adjust the inventory data for the particular item sold, becoming visible chain-wide. A hard copy of the receipt can also be printed in a central printer present in the retail establishment. If the credit purchase is denied, the mobile tablet device displays this credit request decline. The employee of the retail organization informs the customer of this credit purchase rejection and requests another form of payment. Thus the purchase of merchandise by a customer is accomplished by StoreMS Mobile™ by an employee having a mobile scanner gun system anywhere in the store or beyond the store, without the customer having to bring the merchandise to a sales counter and wait in line to consummate the purchase; and, the inventory of any item in the retail establishment is always current and available for purchase transactions carried out by a plurality of sales personnel working with a plurality of customers at a wide variety of locations within the retail establishment.

Figure 2:
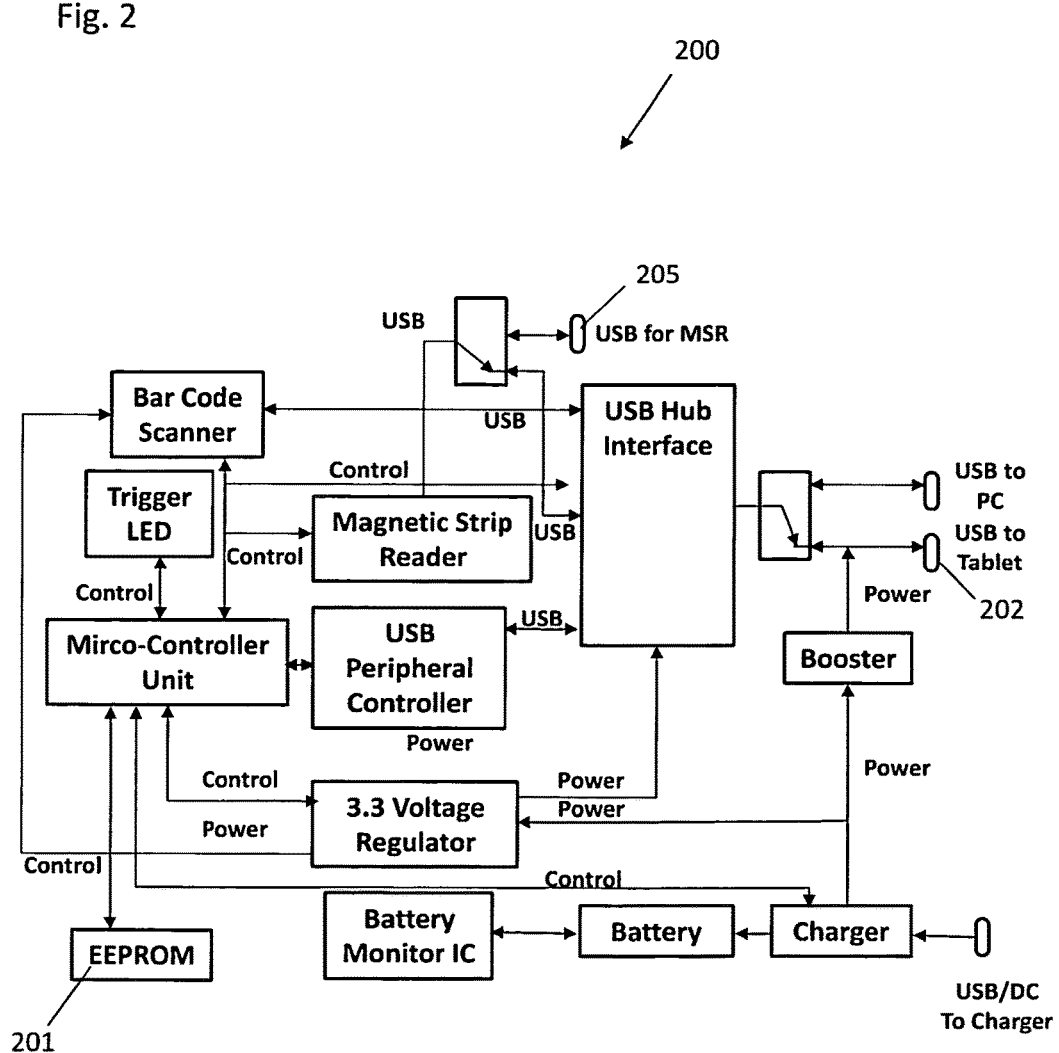
FIG. 2 is a schematic diagram illustrating the circuit of the Main PCB residing in the base housing.

A key feature of the invention is an electrically erasable programmable read only memory (EEPROM) that has a previously programmed instruction set present within the Main PCB. The schematic diagram of the circuit of the Main PCB residing in the upper receiver is shown in FIG. 2 at 200. The EEPROM is shown at 201 and is connected to the mobile tablet device at 202 and can process the command issued by the mobile applications to command either the USB barcode scanner or the MSR input devices to acquire required data. The mobile tablet device has several mobile applications accessed by icons on the mobile tablet device screen and has functionality to communicate wirelessly via Wi-Fi or wireless cellular with a POS store systems server or directly to the corporate ERP system depending on the particular mobile application and function and this communication is secured using standard WPA or WPA2 wireless encryption methods. When the payment card transaction is approved by the bank card issuing authority through the bank card processor via PCI certified network connection, the appropriate encrypted payment card information is wirelessly transmitted via an encrypted communication to the POS store systems server within the store. Unless credit is denied, the purchase is authorized and is sent to the mobile tablet device display screen for customer signature using an integrated signature capture application built within the mobile POS application on the mobile tablet device and the customer is given the purchased merchandise. The receipt for this purchase can be printed on the store network and/or sent by e-mail to the customer. The POS store systems server sends a request to the ERP system to update appropriate allocated inventory for merchandise sold regardless of the inventory fulfillment location. The ERP system processes that request and updates the corporate inventory databases, which are accessible chain-wide.

Due to the use of the EEPROM, which can process barcode and payment card data, the attached mobile tablet device can perform secure distributed sales within a retail establishment. Through the mobile POS application, all store employees know instantaneously the available inventory of any particular item across the chain; any product and its particular details can be reviewed with the customer and sold regardless of the products availability in the store ringing the sale. Thus a customer may look at a variety of products and ask the sales person its price, detailed product description, electronic and physical coupons, promotions and customer loyalty data and rewards that are available to the customer. This provides a friendly, efficient and informative interaction between the customer and the retail salesperson; it establishes a one-on-one face-to-face relationship, which is appreciated by the customer and is conducive to an improved sales environment.

Figure 3:
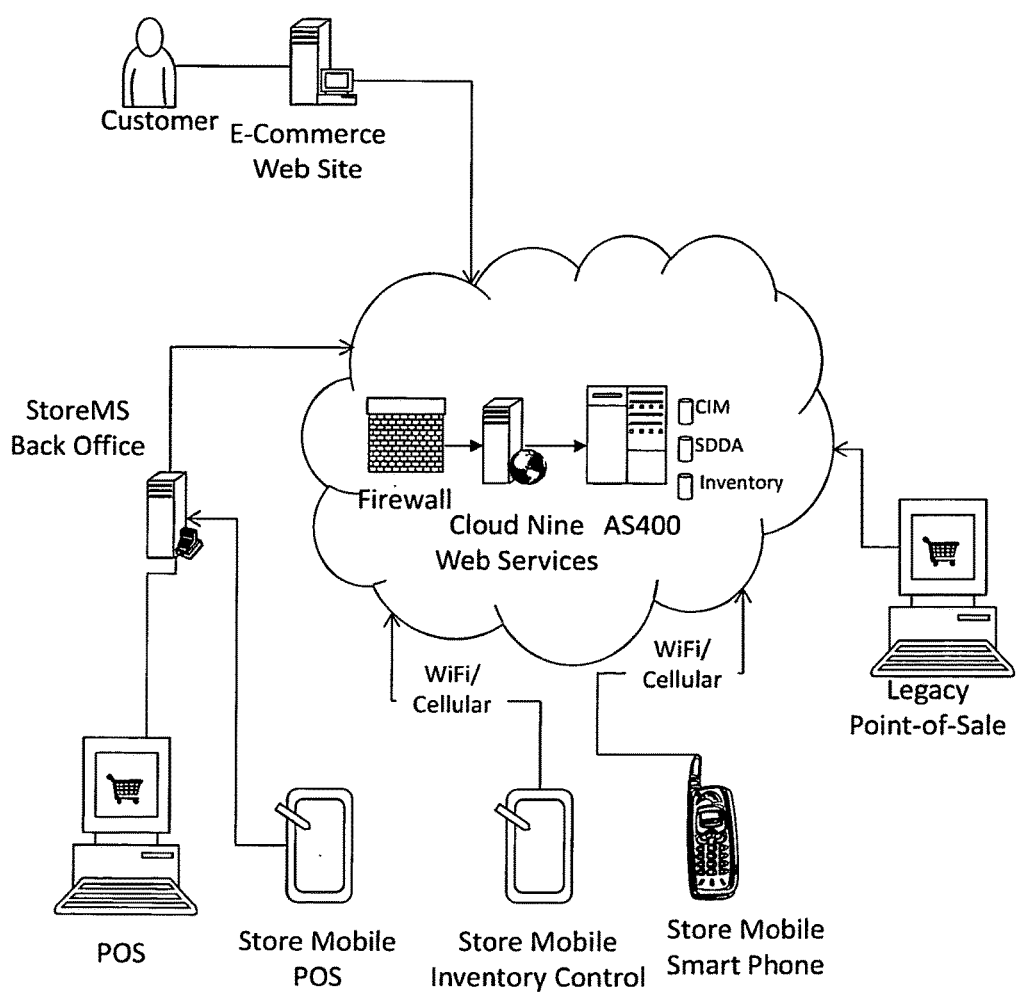
FIG. 3 is a schematic diagram illustrating an embodiment of the StoreMobile Cloud™ environment of the subject system and method.
Figure 4:
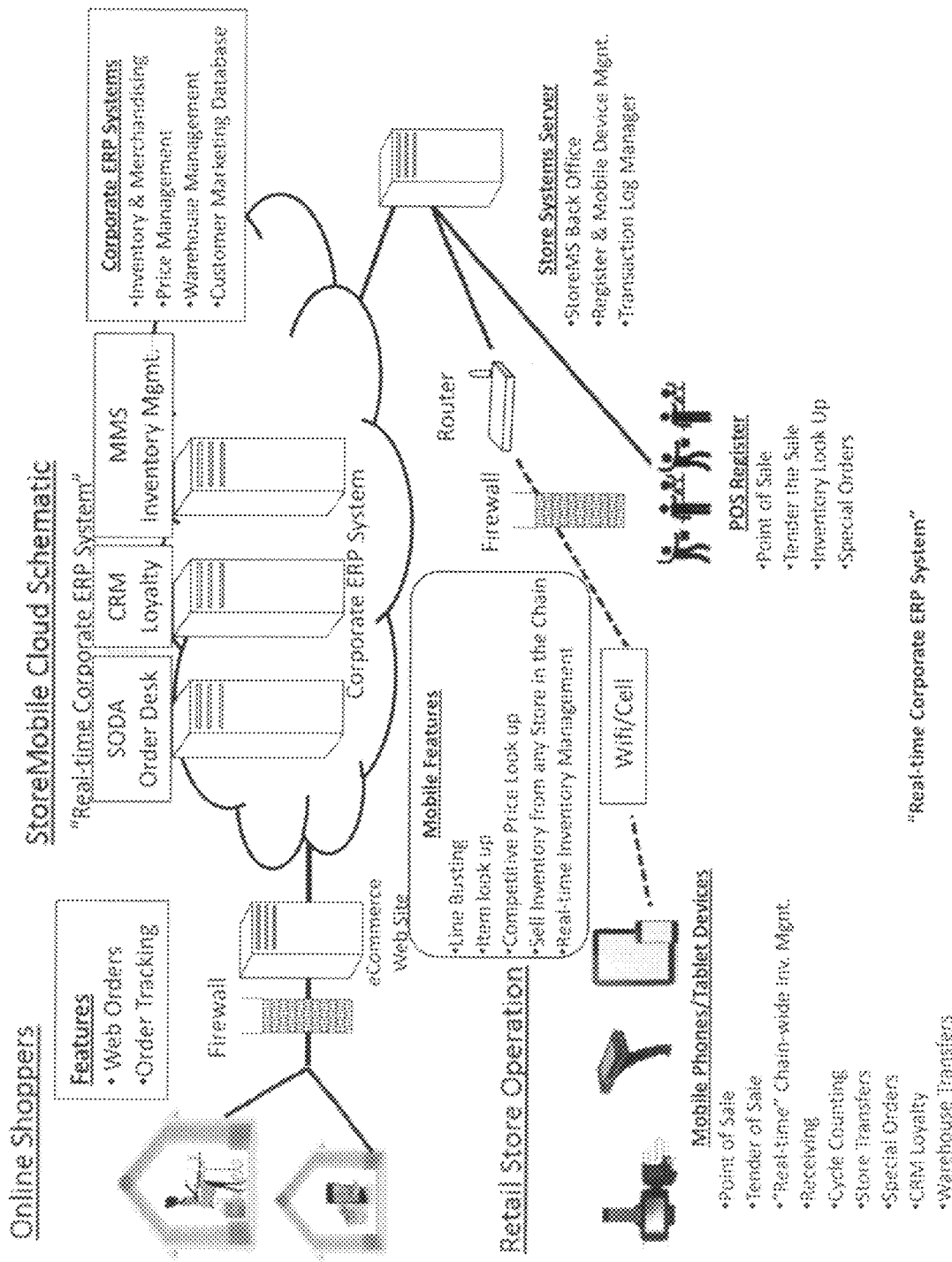
FIG. 4 is an in-depth schematic diagram illustrating an embodiment of the StoreMobile Cloud™ network schematic of the subject system and method.
Figure 5:
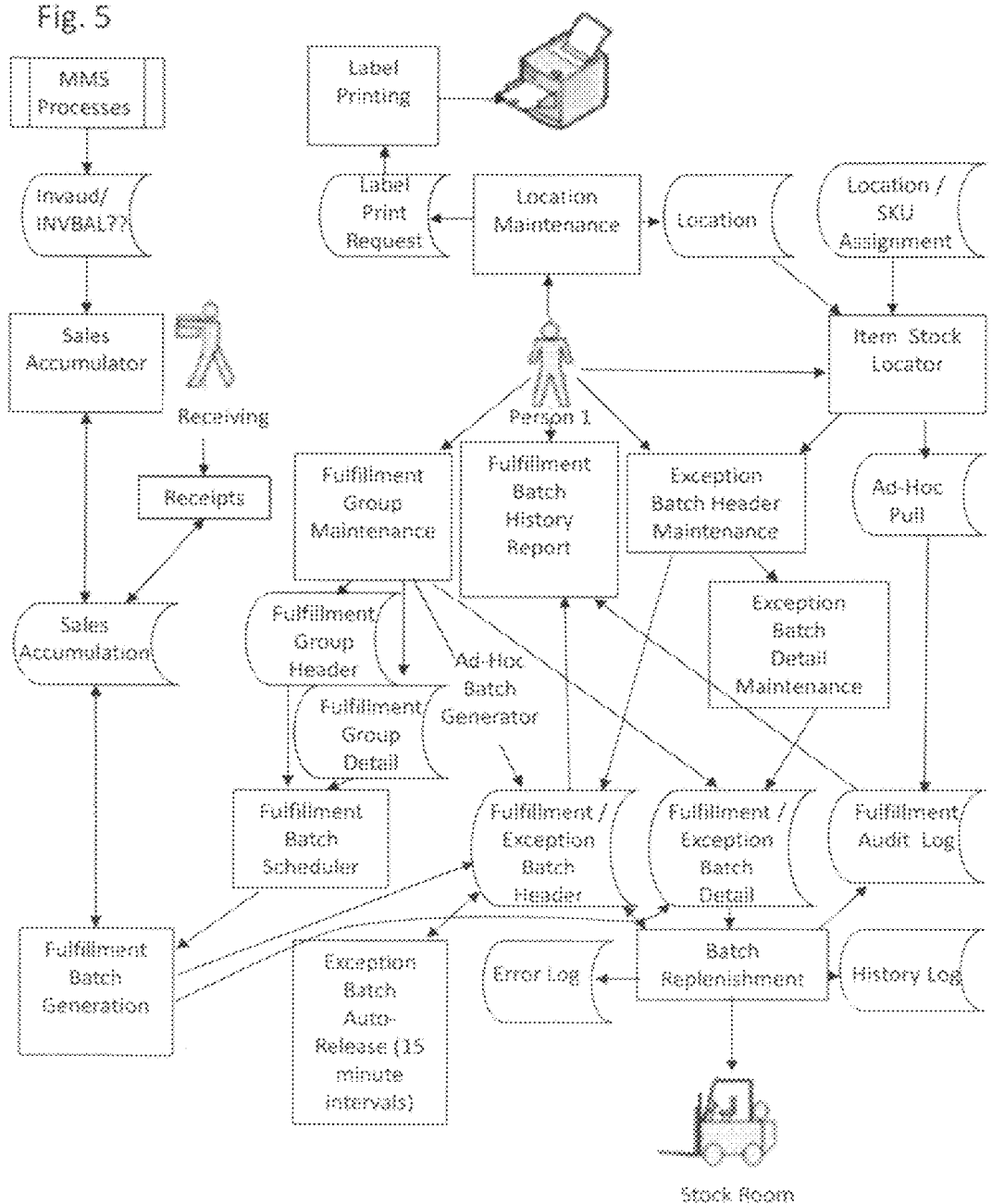
FIG. 5 is a flow chart diagram illustrating an embodiment of the back room management picture flow of the subject system and method.

FIG. 3 is a schematic diagram illustrating an embodiment of the StoreMobile Cloud™ environment of the subject system and method. FIG. 4 is an in-depth schematic diagram illustrating an embodiment of the StoreMobile Cloud™ environment of the subject system and method. FIG. 5 is a flow chart diagram illustrating an embodiment of the back room management picture flow of the subject system and method. Referring generally to FIGS. 3-5, generally a three-phased approach is implemented by the subject system and method.

In phase I of building the StoreMobile Cloud™ environment, the corporate ERP inventory management applications relating to the store are mobilized through the subject system's StoreMobileRF™, a trademark of Retail Technologies Corporation, application. As a result of the system's StoreMobileRF™ application, retailers can manage store inventory in real-time fashion, connected directly to their corporate ERP system from a mobile scanner gun system in any store.

In phase II of building the StoreMobile Cloud™ environment, POS and related store systems are fully operational so that POS customer check-out is mobilized through its StoreMS Mobile™ application. The system's StoreMS Mobile™ application works alongside the system's StoreMobileRF™. Access to the Internet, StoreMS Loyalty™, StoreMS Gift Card™, and end to end encrypted payment card processing are standard features of the mobile scanner gun system's StoreMS Mobile™ application. Advantageously, StoreMS Mobile™ excels at "line busting", reducing overall store register count, or completely replacing all fixed POS cash wrap stations throughout the store.

In Phase III of building the StoreMobile Cloud™ environment, StoreMobileRF™ and StoreMS Mobile™ applications are both up and running together, with StoreMS Mobile™ directly accessing the POS store systems server and StoreMobileRF™ directly accesses the corporate ERP system. Additionally, StoreMS Mobile can now access the corporate ERP system for pertinent inventory availability throughout the chain and sell, transfer, and special order merchandise not available in its own store through the corporate ERP system. Further, the allocation of inventory for these special POS transactions is visible chain-wide through the StoreMobileRF™ application.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A mobile scanner gun system with a mobile tablet device having an electrically erasable programmable read only memory (EEPROM) built into a Main Printed Circuit Board (Main PCB) and integrated into an upper receiver adapted to be connected to a mobile tablet device to process commands issued by mobile application software to command Universal Serial Bus (USB) devices comprising a barcode scanner/reader or Magnetic Strip Reader (MSR) to acquire data, said EEPROM of said Main PCB providing improved database storage and retrieval that organizes said data in proper format and delivers it to said mobile tablet device through a specialized serial bus wiring harness, comprising:
  a) said mobile tablet device removably mounted on said mobile scanner gun and having said mobile application software providing wireless fidelity (Wi-Fi) and wireless cellular secure communicative capability with a point of sale (POS) store systems server in a retail store, which is connected to a corporate Enterprise Resource Planning (ERP) server and said POS store server for managing real-time store level inventory and transacting retail store purchases;
  b) said mobile tablet device being attached to said barcode scanner and said Magnetic Strip Reader (MSR) devices,
  c) mobile table device being removably connected through said specialized universal serial bus wiring harness connected through a base mount universal receiver with rotational coupling to a pistol grip base housing for rotatable connection between said mobile tablet device and said pistol grip base housing of said mobile scanner gun, wherein said base mount universal receiver with rotational coupling is located between said mobile tablet device and said pistol grip base housing, said base mount universal receiver with rotational coupling including a rotating member for conversion of said mobile tablet device from portrait mode to landscape mode without operational delay of said system, a USB barcode scanner input device incorporated within said pistol grip base housing rotationally coupled to said mobile tablet device through said base mount universal receiver;
  d) said mobile tablet device having said previously programmed electrically erasable programmable read only memory (EEPROM) controlling all actions of said Universal Serial Bus (USB) barcode scanner and a gun trigger input device for activating a scan operation of an item, wherein said mobile tablet device displays: i) real-time chain-wide store inventory data and management applications associated with software that provides entry of daily chain-wide store level inventory management directly connected to said corporate ERP system; and ii) POS sales data and transaction means associated with said POS store systems server that provides ability to carry out sales transactions within said mobile application throughout said operating store or beyond its walls regardless of physical location;
  e) said EEPROM adapted to activate said scan operation causing said EEPROM of said Main Printed Circuit Board (PCB) to communicate with said mobile tablet device, launching said application software to ready said mobile tablet device for receiving a scanned barcode, and controlling all actions of said USB and MSR devices;
  e) said corporate ERP server adapted to provide detailed information for daily inventory management purposes for such tasks as physical inventory, cycle counting, inventory receiving, store to store transfers, return to vendor and product re-ticketing;
  f) said POS store systems server providing detailed information of the product scanned, its inventory, selling price, electronic and physical coupons, available promotions and loyalty data and rewards and displaying product data on a display screen of said mobile tablet device;
  g) said mobile scanner gun system comprising said base mount universal receiver adapted to interchangeably mount said mobile tablet device through said specialized universal serial bus wiring harness and communicate with said mobile tablet device, said universal receiver and specialized universal serial bus wiring harness with the mobile tablet device being removable from said mobile scanner gun system and adapted to be readily docked in different base housings including portable housings and fixed docked workstation housings thereby providing portability and interchangeability while functioning to communicate with both said corporate ERP system and said point of sale (POS) store systems server;
whereby said mobile scanner gun system receives full product details, price and promotions and charges a purchase without having the need to bring merchandise to a central checkout station and waiting in queue to check out; and whereby said corporate ERP system enables store level real-time inventory management throughout a retailer's chain, including other locations and warehouses of the retailer.

2. The mobile scanner gun system with mobile tablet device for processing a retail store purchase as recited by claim 1, wherein said mobile tablet device is removably connected to a pistol grip base housing through said base mount universal receiver with rotational coupling.

3. The mobile scanner gun system with mobile tablet device for processing a retail store purchase as recited by claim 2, wherein said rotational coupling is adapted to set the mobile tablet device in portrait or landscape viewing format.

4. The mobile scanner gun system with mobile tablet device for processing a retail store purchase as recited by claim 1, wherein wireless communication may be in the form of Wi-Fi through a plurality of links located within the retail establishment or wireless cellular through data plan provided by a standard cellular carrier.

5. The mobile scanner gun system with mobile tablet device for processing a retail store purchase as recited by claim 1, wherein said application includes a StoreMobileRF application wherein input of real-time daily store level inventory management is inputted and stored for managing inventory from a mobile scanner gun system in any location.

6. The mobile scanner gun system with mobile tablet device for processing a retail store purchase as recited by claim 1, wherein said application includes a StoreMS Mobile application for corporate-wide POS customer sales transactions of said inventory is inputted, processed, tendered and stored for all store POS sales transactions.

7. The mobile scanner gun system with mobile tablet device for processing a retail store purchase as recited by claim 6, wherein said StoreMS Mobile application provides access to customer loyalty data, promotions, physical and electronic coupons, gift cards, and end to end encrypted payment card processing.

8. A mobile scanner gun system, comprising:
  a) a mobile tablet device having an electrically erasable programmable read only memory (EEPROM) built into a Main Printed Circuit Board (Main PCB) and integrated into an upper receiver adapted to process commands issued by a mobile application software to command Universal Serial Bus (USB) devices comprising a barcode scanner/reader or Magnetic Strip Reader (MSR) to acquire data;

b) said EEPROM of said Main PCB providing improved database storage and retrieval that organizes said data in proper format and delivers it to said mobile tablet device through a specialized serial bus wiring harness;

c) said mobile tablet device being removably connected through said specialized universal serial bus wiring harness connected through a base mount universal receiver with rotational coupling to a pistol grip base housing for rotatable connection between said mobile tablet device and said pistol grip base housing of said mobile scanner gun, wherein said base mount universal receiver with rotational coupling is located between said mobile tablet device and said pistol grip base housing, said base mount universal receiver with rotational coupling including a rotating member for conversion of said mobile tablet device from portrait mode to landscape mode without operational delay of said system, a USB barcode scanner input device incorporated within said pistol grip base housing rotationally coupled to said mobile tablet device through said base mount universal receiver; said mobile table device providing a non-transitory computer readable electronic storage medium storing one or more programs comprising instructions executable by a portable multifunction device having a touch screen display and Internet capability to cause the device to: display real-time chain-wide store level inventory data and management applications associated with software that provides entry of daily chain-wide store level inventory management applications directly connected to the corporate ERP system; display POS data and transaction means associated with said POS store system's server that provides ability to carry out customer sales transactions within said mobile application throughout a retailer's store and beyond its walls, regardless of physical location; the portable multifunction device enabled to be operative to establish a connection between the mobile tablet device and a mobile scanner gun system and to be mountable thereon;

wherein the system is adapted to provide relevant store inventory information and POS transaction capability through said base mount universal receiver and said tablet is capable of being interchanged between said pistol grip base housing, a handheld device, and a fixed docked POS workstation while functioning to communicate with both said corporate ERP system and said point of sale (POS) store systems server.

9. The system as recited by claim 8, wherein said portable multifunction device is removably connected to a pistol grip base housing through a base mount universal receiver with rotational coupling.

10. The system as recited by claim 9, wherein said rotational coupling is adapted to set the mobile tablet device in portrait or landscape viewing format.

11. The system as recited by claim 8, wherein said mobile application software provides wireless communication in the form of Wi-Fi through a plurality of links located within the retail establishment or wireless cellular through a data plan provided by a standard cellular carrier.

12. The system as recited by claim 8, wherein said programs include a StoreMobileRF application wherein input of store level inventory management is inputted and stored for managing inventory from a mobile scanner gun system in any chain-store location.

13. The system as recited by claim 8, wherein said programs include a StoreMS Mobile application for in-store POS customer check out of said merchandise, which is inputted, processed, tendered and stored for POS sales transactions.

14. The system as recited by claim 13, wherein said StoreMS POS application provides access to customer loyalty data and rewards, promotions, physical and electronic coupons, gift cards, and end to end encrypted payment card processing.

15. A mobile scanner gun system adapted to receive a mobile tablet device for processing a retail store point of sale (POS) transaction, comprising:

a) A mobile scanner gun comprising:
  i) a main body portion extending toward a handle portion, said main body portion having a base, side walls, a top wall, a front wall and a back wall constructed to form an interior cavity, wherein said front wall includes an aperture with a lens recessed therein;
  ii) said front wall having a trigger member located near said base of said main body;
  iii) a Universal Serial Bus (USB) scanner input device mounted above and in front of said trigger, said scanner input device having two drivers, including 1) a native device driver and 2) a keyboard input driver, said scanner input device being in communication with said trigger for initiating a scan of a barcode;
  iv) a USB Magnetic Strip Reader (MSR) input device for carrying out and processing sales transaction is located on an upper receiver alongside a short edge of a mobile tablet device and directly above a scanner, said MSR being end to end encrypted through to a bank card authorization processor for Payment Card Industry (PCI) compliance requirements;
  v) said top wall of said main body portion having a rotating attachment means comprising a base mount universal receiver with rotational coupling means adapted to interchangeably mount the mobile tablet device on said top wall through a specialized universal serial bus wiring harness and communicate with the mobile tablet device, the mobile tablet device having a system integrated therein that enables store level real-time inventory management and a fully functioning POS capability for selling merchandise in a retail sales environment, said universal receiver and specialized universal serial bus wiring harness with the mobile tablet device being removable from said top wall of said main body portion and adapted to be readily docked in different base housings including portable housings and fixed docked workstation housings thereby providing portability and interchangeability while functioning to communicate with both said corporate ERP system and said point of sale (POS) store systems server;
  vi) said base mount universal receiver with rotational coupling means comprises a rotating member for conversion of said mobile tablet device from portrait mode to landscape mode without operational delay of said system, a USB barcode scanner input device incorporated within said pistol grip base housing rotationally coupled to said mobile tablet device through said base mount universal receiver;

b) the mobile tablet device being removably connected through said specialized universal serial bus wiring harness to said base mount universal receiver with rotational coupling to said main body of said mobile scanner gun for rotatable connection between said mobile tablet device and said pistol grip base housing, wherein said base mount universal receiver with rotational coupling is located between said mobile tablet device and said pistol grip base housing, said base mount universal receiver with rotational coupling including a rotating member for conversion of said mobile tablet device from portrait mode to landscape mode without operational delay of said system, said mobile table device having mobile application software having an improved database storage and retrieval system and providing wireless fidelity (Wi-Fi) and wireless cellular secure communicative capability with a point of sale (POS) store systems server in a retail store, which is connected to a corporate Enterprise Resource Planning (ERP) system and said POS store systems server for managing real-time store level inventory and transacting retail store purchases;

c) said mobile tablet device being attached to said barcode scanner and Magnetic Strip Reader (MSR) devices through said specialized universal serial bus wiring harness;

d) said mobile tablet device having a previously programmed electrically erasable programmable read only memory (EEPROM) controlling all actions of said Universal Serial Bus (USB) barcode scanner and a gun trigger input device for activating a scan operation of an item, wherein said mobile tablet device displays: i) real-time chain-wide store inventory data and management applications associated with software that provides entry of daily chain-wide store level inventory management directly connected to said corporate ERP server; and ii) POS sales data and transaction means associated with said POS store server that provides ability to carry out sales transactions within said mobile application throughout said operating store or beyond its walls regardless of physical location;

e) said EEPROM adapted to activate said scan operation causing said EEPROM of said Main Printed Circuit Board (PCB) to communicate with said mobile tablet device, launching said application software to ready said mobile tablet device for receiving a scanned barcode; , and controlling all actions of said USB and MSR devices, said Main PCB having said previously programmed electrically erasable programmable read only memory (EEPROM) adapted to control all actions of said USB and MSR devices by swiping a payment card through a slot of said MSR for processing a payment through a proper secured bank card processing network;

f) said EEPROM adapted to communicate with said mobile tablet device upon activation of said MSR operation, launching said application software to ready said mobile tablet device for receiving payment card data;

g) said corporate ERP server adapted to provide detailed application communicating with said corporate ERP system to obtain detailed information for daily inventory management purposes for such tasks as physical inventory, cycle counting, inventory receiving, store to store transfers, return to vendor and product re-ticketing;

h) said POS store server adapted to obtain detailed information of the product scanned, its inventory, selling price, electronic and physical coupons, available promotions and loyalty data and rewards and displaying product data on a display screen of said mobile tablet device;

whereby merchandise can be purchased from any retail store having a mobile scanner gun system receiving full product details, price and promotions and charges the purchase in a friendly, efficient, informative atmosphere without having the need to bring merchandise to a central checkout station and waiting in queue to check out; and whereby said corporate ERP system enables store level real-time inventory management throughout a retailer's chain, including other locations and warehouses of the retailer.

* * * * *